United States Patent [19]
Darwood

[11] 3,959,591
[45] May 25, 1976

[54] TELEPHONE ANSWERING APPARATUS

[75] Inventor: James R. Darwood, Paramount, Calif.

[73] Assignee: T.A.D. Avanti, Inc., Paramount, Calif.

[22] Filed: June 24, 1974

[21] Appl. No.: 481,966

[52] U.S. Cl. .................................. 179/6 R; 360/92
[51] Int. Cl.² .................... H04M 1/64; G11B 23/04; G11B 15/68
[58] Field of Search ............ 179/6 R, 6 AC; 360/92, 360/96, 106, 105, 60, 66, 118, 91

[56] References Cited
UNITED STATES PATENTS

| | | | |
|---|---|---|---|
| 3,455,559 | 7/1969 | Wilson | 360/106 |
| 3,649,762 | 3/1972 | Okamura | 179/6 R |
| 3,700,818 | 10/1972 | Tatematsu et al. | 179/6 R |
| 3,721,765 | 3/1973 | Ho | 179/6 R |
| 3,780,226 | 12/1973 | Jacobson | 179/6 R |
| 3,860,963 | 1/1975 | Ueda | 179/6 R |

Primary Examiner—Vincent P. Canney
Attorney, Agent, or Firm—Keith D. Beecher

[57] ABSTRACT

A telephone answering apparatus is provided which is simple in its construction as compared with the usual prior art systems, but which is capable of performing all the operations performed by the prior art systems, and more. The apparatus of the invention includes electronic solid state circuitry, and it is simplified materially as compared with the usual prior art mechanisms. The embodiment to be described utilizes but two mechanical relays to perform all the switching operations. A multiple channel announcement tape deck is used with a simplified channel changing mechanism. A cassette-type tape is included to record the messages from the calling party for convenient message storage. The cassette is spring loaded so that it can be pulled back for a "fast forward" tape drive capability. The apparatus involves a simplified mechanical assembly as compared with the prior art units of the same general type in that, iner alia, a single drive motor is used for all the tape drive mechanisms, and an improved progressive inter-lock system is used to assure that only one tape drive mechanism will be activated at any one time.

8 Claims, 9 Drawing Figures

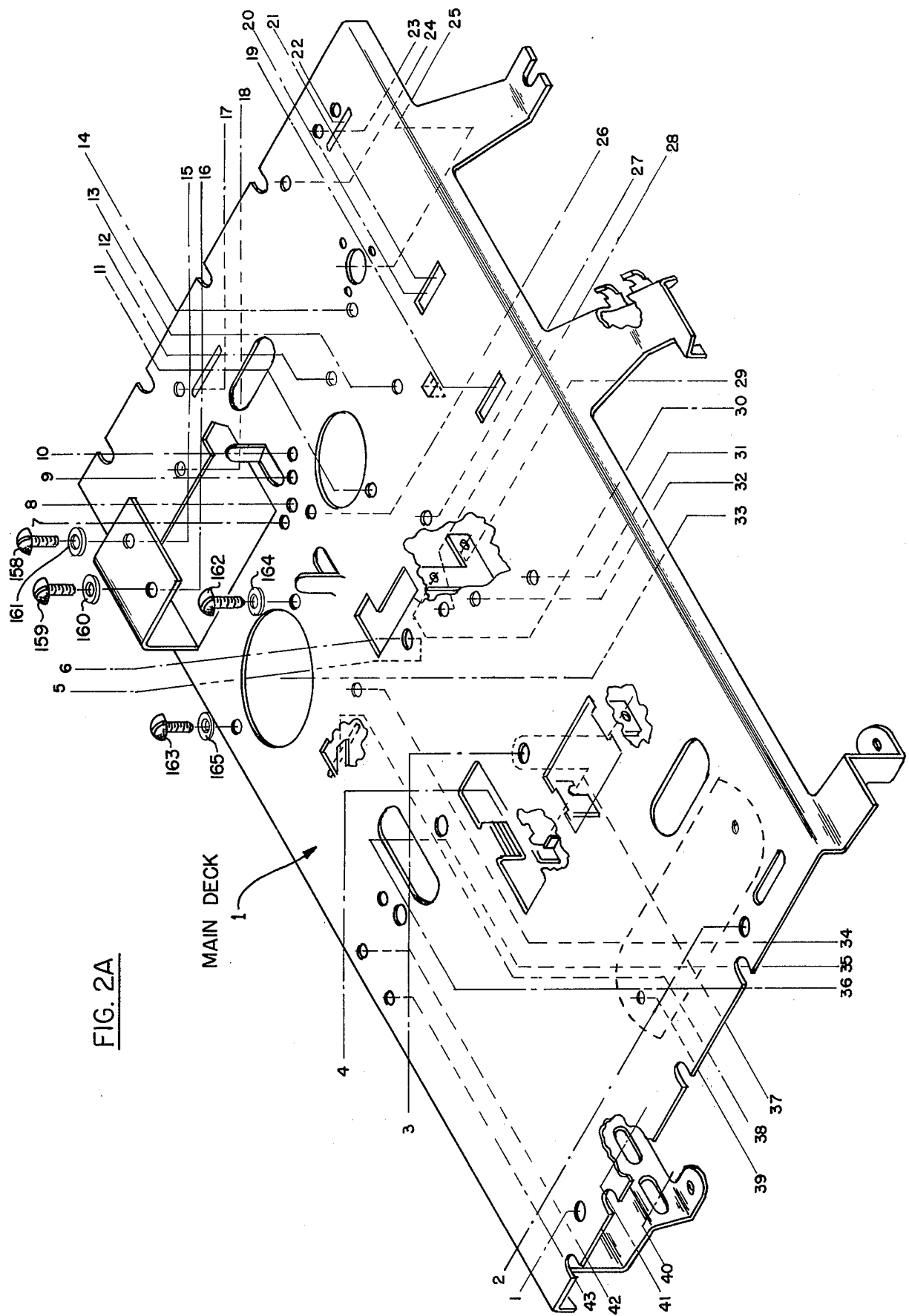

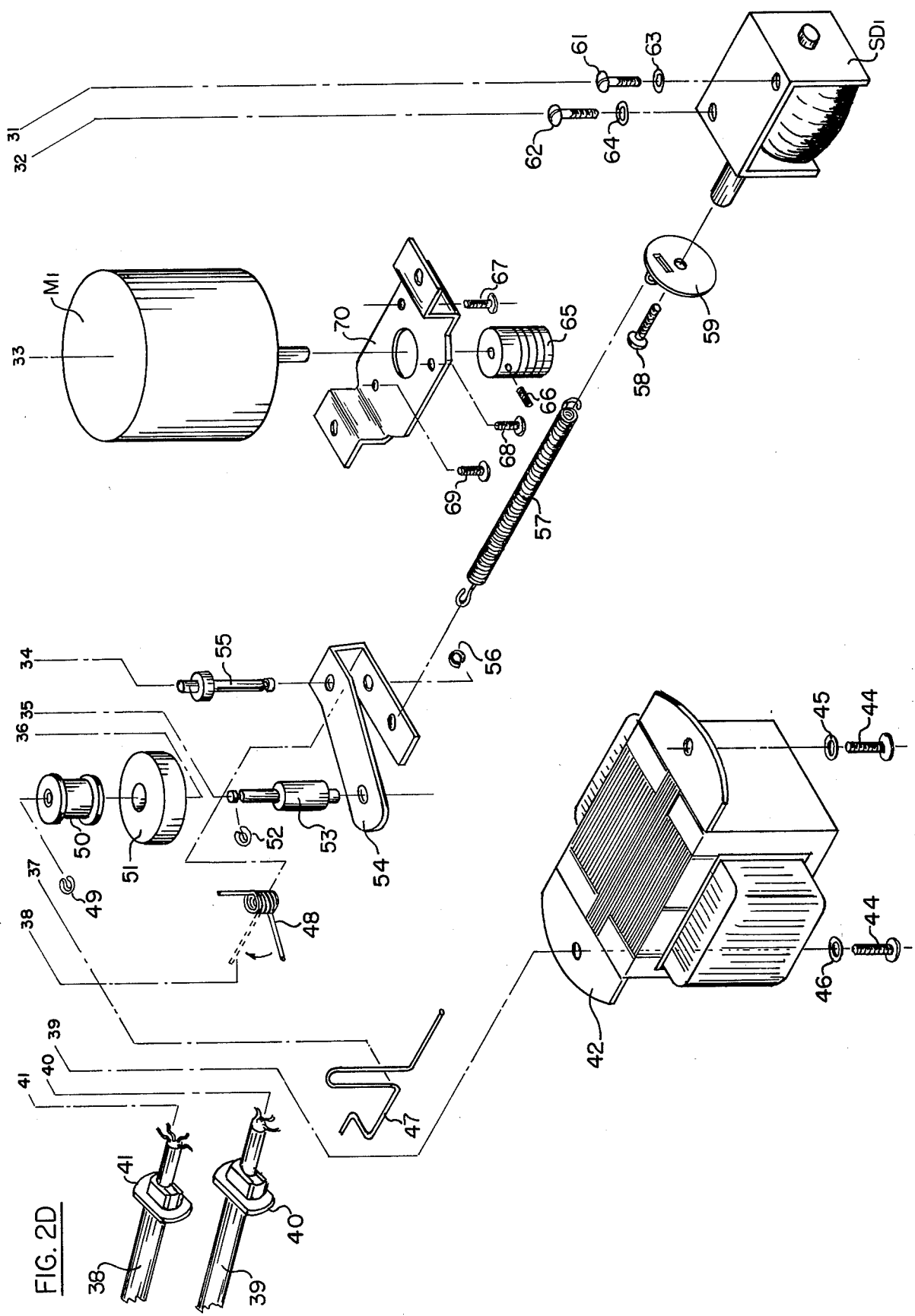

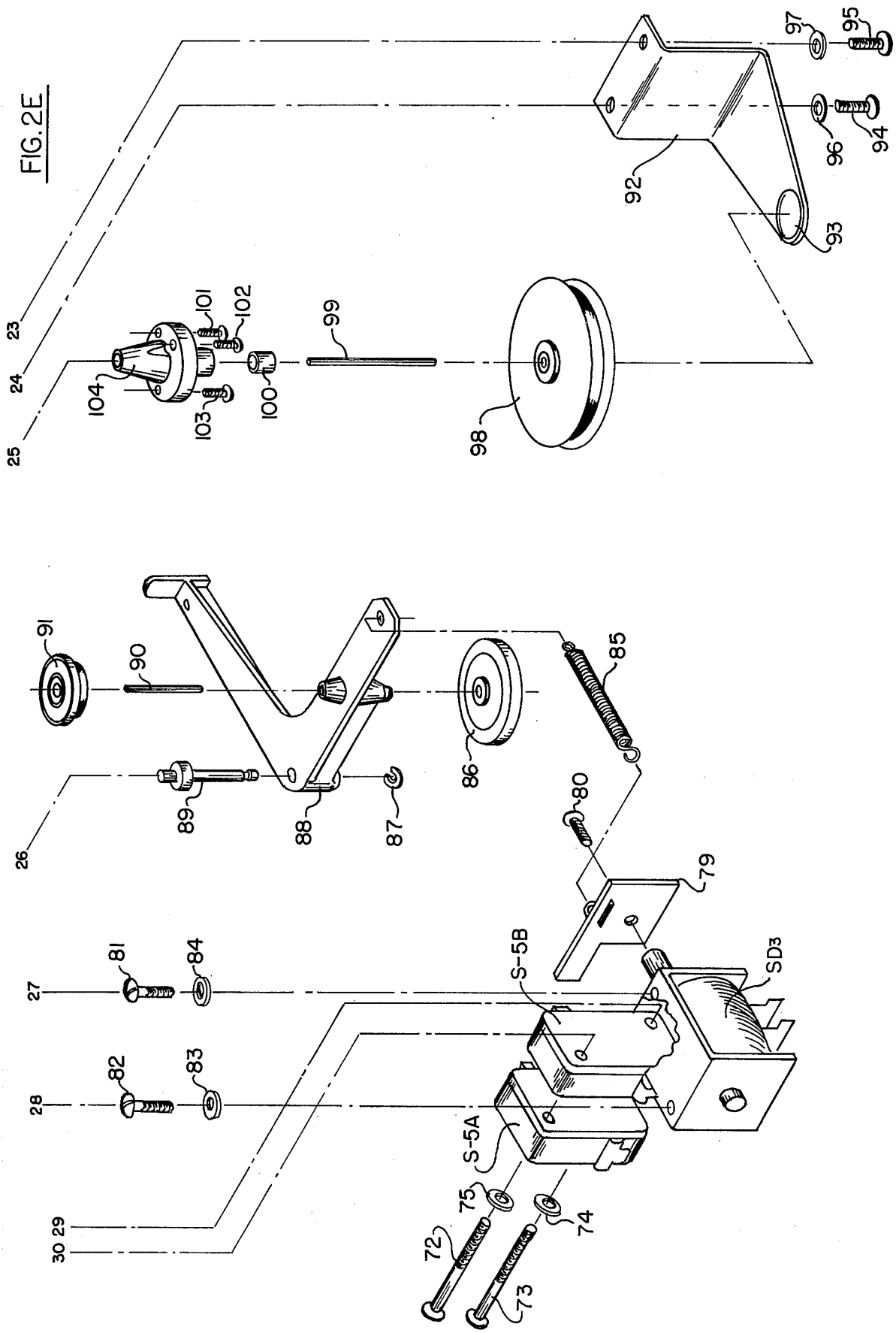

TELEPHONE ANSWERING APPARATUS

BACKGROUND OF THE INVENTION

Telephone answering systems in general are well known to the art. Such systems respond to an incoming telephone ring signal to transmit a recorded announcement to a calling party during a first time interval (T1), and they then automatically enter a message recording mode during a second time interval (T2) during which they record a message from the calling party.

Most prior art telephone answering systems, however, are complex in their construction, and incorporate complicated relay circuits involving a multiplicity of mechanical relays in order to achieve the required switching functions. The telephone answering systems of the prior art also generally involve relatively complicated controls and other electronic circuits.

The telephone answering apparatus of the present invention is constructed to retain all the basic functions of the prior art systems and apparatus, and yet it involves a relatively simple and inexpensive assembly, and relatively simple electronic controls and circuitry.

BRIEF DESCRIPTION OF THE DRAWINGS

FIGS. 2A–2E are exploded representations of the mechanical components which make up the apparatus of the invention in one of its embodiments;

DETAILED DESCRIPTION OF THE ILLUSTRATED EMBODIMENT

Figure 1:
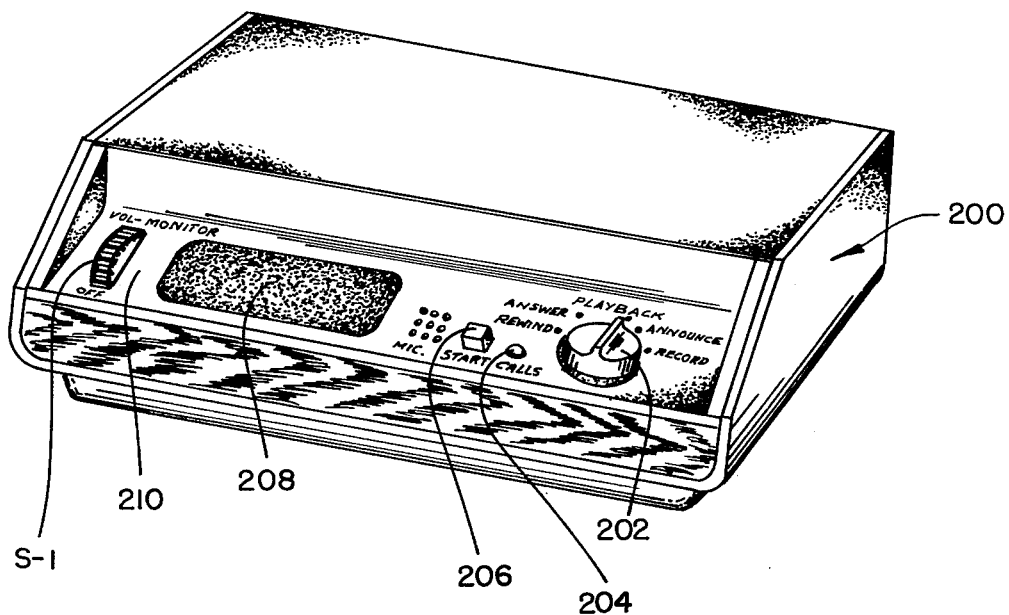
FIG. 1 is a perspective representation of a telephone answering instrument which incorporates the improved and simplified apparatus of the present invention.
Figure 5:
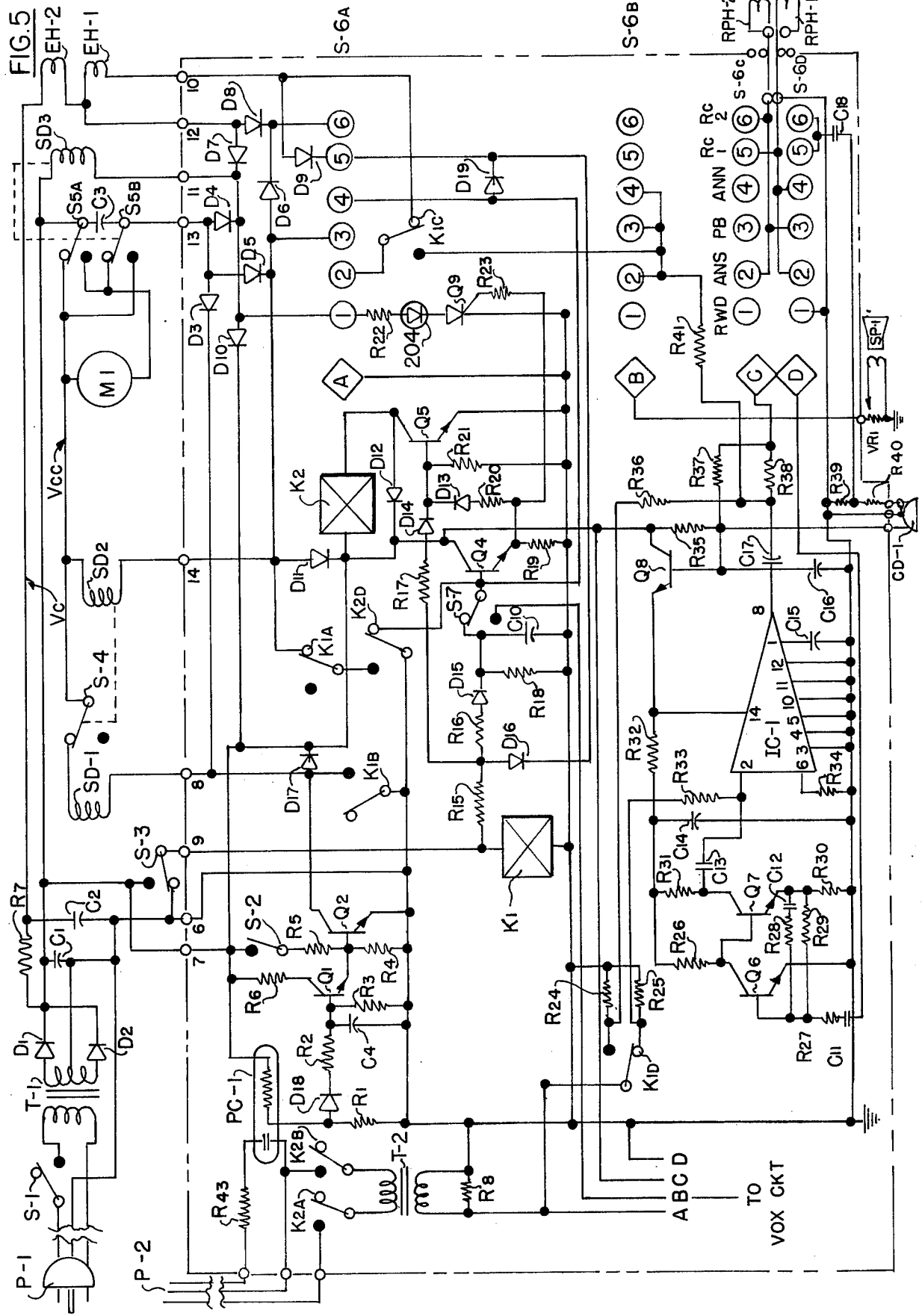
FIG. 5 is a circuit diagram of the electronics used in the apparatus.

The telephone answering apparatus of the invention is constructed for direct use in conjunction with the telephone line, and it may be plugged into a usual telephone jack by a telephone connecting cord or cable 38 (FIG. 2D). The apparatus of the invention includes, as shown in FIG. 1, a casing 200. The casing has a control panel 201 extending along its forward edge. An operating dial 202 is mounted on the control panel, and this dial controls a six-position rotary slide switch S-6 (FIG. 5). The switch may be set to six different positions, namely "Rewind", "Answer", "Playback", "Announce Only", "Record-1" and "Record-2".

A call light 204 is mounted on the control panel 201 which is illuminated whenever a call has been received by the instrument. A start button 206 is also mounted on the control panel which, when depressed, operates a switch S-2 (FIG. 5). Operation of switch S2 simulates a received telephone call, and places the instrument in operation. Also, and "on/off" switch S-1 is mounted on the control panel in conjunction with a volume control potentiometer, which will be described. The instrument includes a speaker SP1 (FIG. 5) and a microphone CD1 (FIG. 5) which are mounted behind a grille 208 on the control panel. The top of the casing 200 has a hinged lid 210 which may be opened to permit access to the cassette tape deck, so that cassettes may be inserted and removed from the instrument.

The apparatus as shown in FIGS. 2A–2E, 3 and 4, includes a main deck 1 which is mounted within the casing 200, and which is spaced up from the bottom of the casing. The electronic circuitry for the unit is provided on a printed circuit board (not shown) which is mounted under the main deck 1.

The telephone line cable P2 is designated 38 in FIG. 2D, and it is supported on the main deck by means of a strain relief bushing 41. The alternating current power cord P1 is designated 39, and it is supported on the main deck by means of a strain relief bushing 40. The power transformer T1 is designated 42, and it is mounted on the underside of the main deck 1 by mounting screws 43 and 44, and associated washers 46 and 45.

A separate platform 2 is mounted on the main deck 1, and this platform supports the various components which make up the announcement tape sub-assembly of the unit. Many of the components are molded integral with the platform to reduce manufacturing costs and to facilitate the assembly of the apparatus. The sub-assembly includes a microswitch S-3 which is actuated by a feeler wire 4, and which is operated whenever the continuous announcement tape AT (FIG. 3) reaches a reference position.

A head mounting plate 5 is mounted on the platform 2 by means of a hinge at one end of the plate. A head pressure pad 6 is mounted adjacent the end of the mounting plate, and two electromagnetic heads EH1 and RPH1 are mounted on the mounting plate in facing relationship with the pad. The head EH1 is the T1 erase head, and the head RPH1 is the T1 record/playback head. The head 8 is mounted in place by mounting screws 9 and 11 and associated washers 10 and 12. The head 7 is mounted in place by mounting screws 13 and 15, and associated washers 14 and 16.

A tape tension arm 19 is mounted on the platform 2, and it is spring-biased by a spring 18. A plurality of idler pulleys 17, 20, 21, 22, 23, 24, 25, 26 and 27 are mounted about the platform 2, and the announcement tape AT is looped around the pulleys in the manner shown in FIG. 3. As shown, the announcement tape is a continuous tape and, during the T1 interval, it moves a complete loop, so that the RP1 head 8 can sense and play back the recorded announcement.

A drive capstan 30 for the announcement tape extends up through the platform 2, and is supported in bearings 28 and 29. The capstan 30 is fitted into a press-fit with a flywheel pulley 31 on the underside of the platform in a bracket 32, and the pulley rests against a fiber pad 33 at the end of the bracket. The bracket is mounted on the underside of the platform 2 by mounting screws 34 and 35, and associated washers 37 and 36.

Figure 2B:
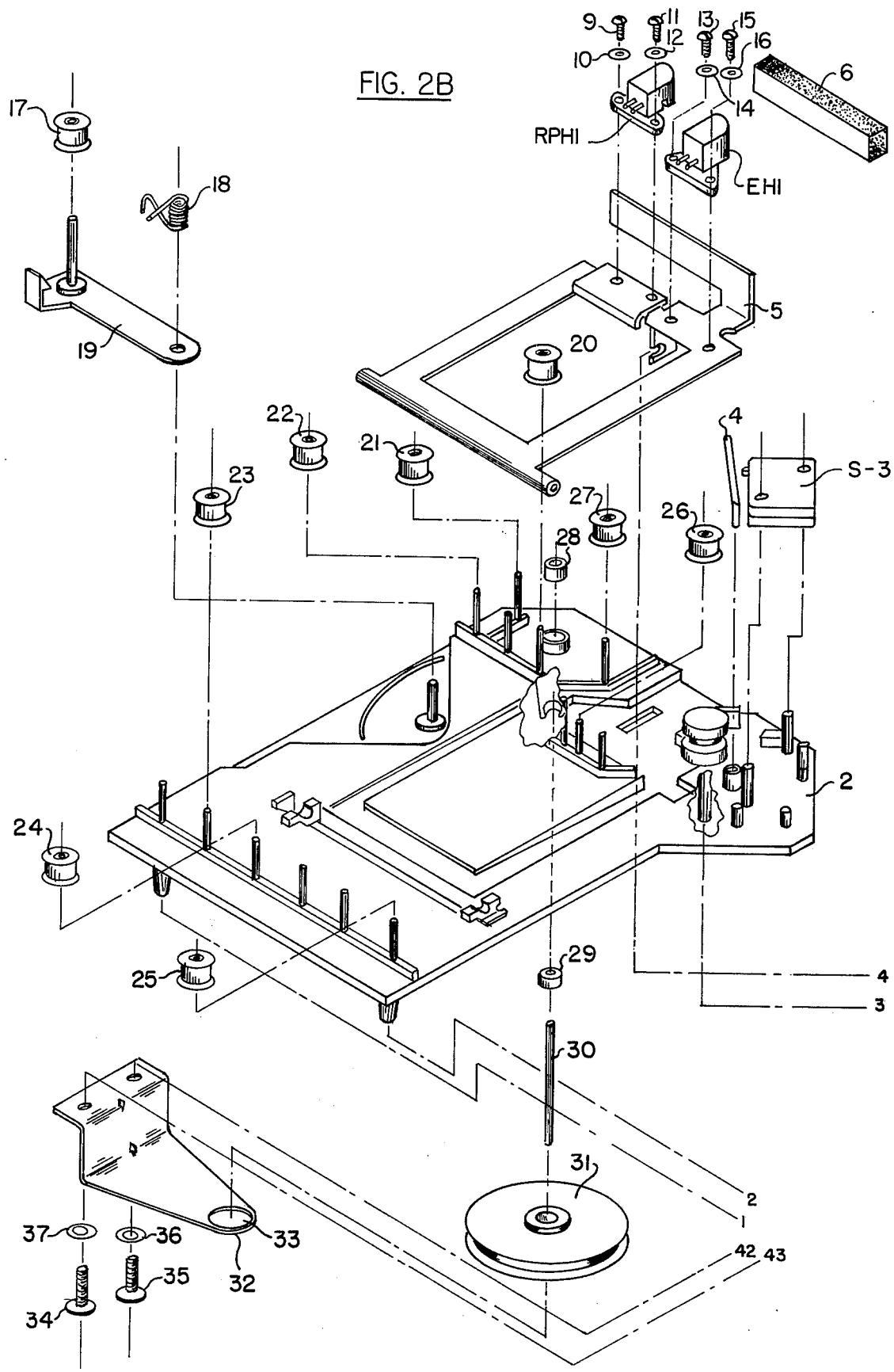

A selector lever 47 (FIG. 2D) is mounted under the head mounting plate 5 of FIG. 2B, and serves to move the mounting plate angularly about the axis of its hinge, so that the heads 7 and 8 may be properly positioned with respect to any selected channel on the announcement tape AT.

The announcement tape may have several recording channels, with a different announcement recorded in each channel. To operate the announcement tape, a rubber sleeve 51, which forms part of the T1 pinch roller sub-assembly, forces the tape AT against the capstan 30. This is achieved when the SD1 solenoid (FIG. 2D) is energized. The solenoid SD1 is mounted under platform 2 by mounting screws 61, 62 and washers 63, 64. It is coupled to a plunger plate 59 by means of a screw 58. The plunger plate 59 is connected to an over-travel spring 57 which, in turn, connects with an arm 54. The arm 54 is pivotally mounted under the platform 2 of FIG. 2B by means of an axle 55. The axle is held in place by means of a split washer 56. A further axle 53 is mounted on the free end of the arm 54, and it supports a bearing 50 on which the rubber sleeve 51 is rotatably mounted. These components are held on the axles by split washers 49 and 52. A return spring 48 is also coupled to the arm 54.

It will be appreciated that under normal conditions, the spring 48 biases the rubber sleeve away from the announcement tape. However, when the SD1 solenoid is energized, the arm 54 is turned to move the rubber sleeve against the tape AT, so as to pinch the tape against the capstan 30 to cause the tape to be drawn passed the electromagnetic heads 7 and 8.

The motor M1 is mounted on a mounting bracket 70 on the underside of the main deck 1 (FIG. 2D) by mounting screws 162, 163. A pulley 65 is mounted on the drive shaft of the motor, and it is held on the shaft by means of a set screw 66. The bracket is held in place by mounting screws 67, 68, 69. A pair of rewind microswitches S-5A, S-5B (FIG. 2E) are mounted under the main deck 1 by mounting screws 72 and 73, and associated washers 75 and 74. The rewind solenoid SD3 is mounted under the main deck by mounting screws 82 and 81, and associated washers 83 and 84. The rewind solenoid SD3 is connected to a plunger plate 79 by means of a screw 80, and the plunger plate is connected to an over-travel spring 85 which, in turn, is connected to a spindle drive arm 88. The plunger plate 79 has an arm which actuates the switches S-5A and S-5B when SD3 is energized. The spindle drive arm 88 is pivotally mounted to the main deck 1 by means of an axle 89. A spindle drive shaft 90 is mounted on the arm 88, and a drive pulley 86 is mounted on the lower end of the spindle 90, and the drive spindle 91 is mounted on the upper end.

As mentioned above, the messages received by the instrument of the invention are recorded on a cassette-type of magnetic tape. The cassette is received on the main deck, and its tape is driven by a capstan 99 extending up through the main deck. A flywheel pulley 98 is mounted on the lower end of the capstan 99, and is supported on a fiber pad 93 mounted on a bracket 92. The bracket 92 is mounted on the underside of the main deck 1 by mounting screws 94 and 95, and associated washers 96 and 97. The capstan 99 is supported in a bearing housing 104 by a bearing 100. The housing 104 is mounted on the main deck by mounting screws 101, 102, and 103.

Figure 2C:
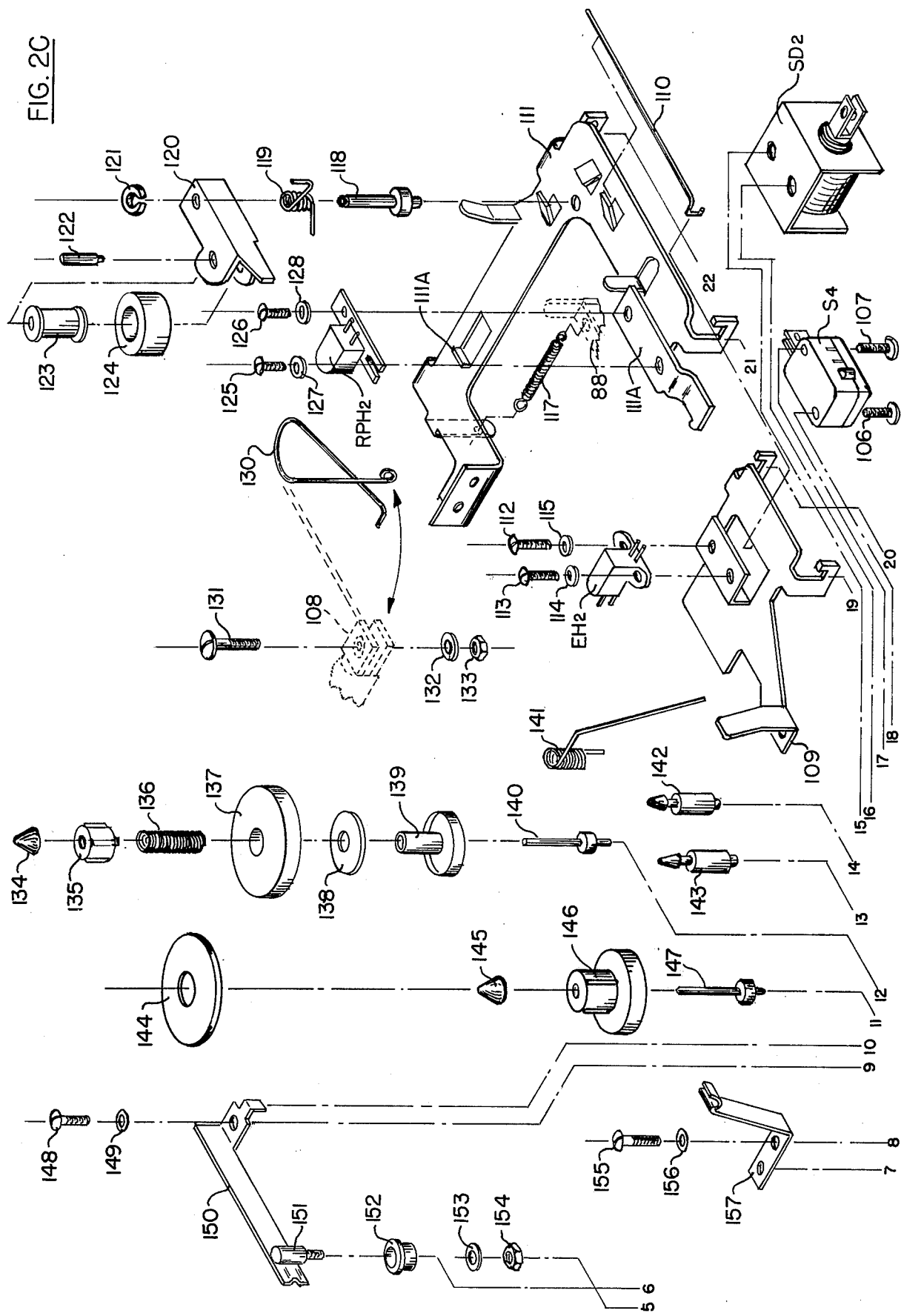

A microswitch S-4, as shown in FIG. 2C, is mounted on the main deck 1, by mounting screws 106 and 107. The solenoid SD2 is mounted under a bracket on the main deck by mounting screws 158, 159 and associated washers 161, 160 (FIG. 2A). A plate 109 for the erase head EH2 is slidably mounted on the deck 1, and a plate 111 for the head RPH2 is slidably mounted on the deck adjacent the plate 109. A coupling bracket 111A extends between the plates 111 and 109. The erase head EH2 is mounted on plate 109 by mounting screws 112 and 113, and associated washers 115 and 114. A return spring 110 also intercouples the plates 109 and 111. The head RPH2 is mounted on the plate 111 by mounting screws 125, 126 and associated washers 127, 128.

The solenoid SD2 is mechanically coupled to the plate 111 through an over-travel spring 130 which is attached to the plunger of the solenoid by a retainer screw 131. A return spring 141 is provided which resiliently biases the plate 109, which in turn biases the plate 111 through bracket 111A, to their disengaged positions.

A housing 120 for the cassette pinch roller subassembly is mounted on axle 118 which, in turn, is mounted on plate 111. A biasing spring 119 is provided on the axle for the housing 120. The housing 120 is mounted on the axle by a split washer 121. A rubber pinch roller sleeve 124 is rotatably mounted on an axle 122 in housing 120 by a bearing 123.

A microswitch 54, as shown in FIG. 2C, is mounted on the main deck 1 by mounting screws 106 and 107. The solenoid SD2 is also mounted on the main deck. A further head plate 111 is mounted on the main deck 100, and is moved between an operating position and a stand-by position by the SD2 solenoid 108. The head plate 111 has an up-standing projection 111A which operates switch S-4 when the solenoid SD2 is energized. An EH2 erase head 116 for the cassette is mounted on the head plate 109 by mounting screws 112 and 113, and associated washers 115 and 114.

A return spring 117 is provided for the spindle drive arm 88 of FIG. 2E. A housing 120 for the cassette pinch roller sub-assembly is mounted on an axle 118 extending through the head plate 111. A biasing spring 119 is provided on the axle to maintain the housing 120 normally in a disengaged position. The housing 120 is mounted on the axle 118 by means of a split washer 121. A rubber sleeve 124 is supported on a bearing 123 in the housing 120 by means of an axle 122 extending through the housing.

When the solenoid SD2 is energized, the head plate 111 is drawn inwardly to move the rubber sleeve 124 against the tape in the cassette, so as to pinch the tape against the capstan 99 of FIG. 2E and cause the tape to move in the forward direction. The record/playback head RPH2 is mounted on the head plate 111 by mounting screws 125 and 126, and associated washers 127 and 128. The solenoid SD2 is coupled to the head plate 111 through an over-travel spring 130 which is mounted on the plunger of the solenoid by means of a retainer screw 131. A return spring 141 is provided for the head plate 111. The over-travel spring 130, as well as the over-travel springs 57 and 85 described above, facilitate the assemblage of the apparatus, since they obviate any need for critical tolerances or adjustments.

The cassette is removably positioned on the main deck by means of a pair of positioning pins 142 and 143. A pair of spindle axles 140 and 147 extend upwardly through the main deck adjacent the pins 142 and 143 respectively. A feed spindle 146 is supported on the axle 147, and a take-up spindle 139 is supported on the axle 140. A felt washer 138 is fitted over the take-up spindle 139, and a wheel 137 is fitted on the take-up spindle 139 over the felt washer 138. A spring 136 holds the wheel 137 in place against the felt washer in a slip-clutch arrangement. The spring is held on the axle 140 by a cap 135 and retainer 134. The feed spindle 146 is held in place by a retainer 145. A cassette hold-down spring 157 is mounted on the main deck by a screw 155 and associated washer 156.

An eccentric disc 144 is fitted in press fit over the retainer when a remote control is incorporated into the unit, such as described in copending application Ser.

No. 460,921. A remote switch spring arm 150 is mounted on the main deck 1 by means of a mounting screw 148 and washer 149. A remote switch post 151 is mounted on the end of the arm 150, and an insulating washer 152 is held on the post 151 by a nut 154 and interposed washer 153. The spring arm is operated by the eccentric to ground the switch post 151 once for each revolution of the eccentric, to produce pulses whenever the cassette tape is moving.

When the solenoid SD2 is energized, the head plates 109 and 111 are drawn towards the cassette unit on spindles 140, 147; and the plate 111 moves the pinch roller sleeve 124 against the tape in the cassette, to pinch the tape against the capstan 99 of FIG. 2F, and to cause the tape to move in the forward direction. During this operation the drive wheel 91 (FIG. 2E) engages the take-up spindle wheel 137 to tend to drive the take-up spindle 142 at a faster speed than the capstan drive so as to produce slippage through the clutch washer 138. For "Fast Forward" the plate 110 is moved back against the tension of spring 130 to release the pinch roller 124, and thereby to enable the tape to be driven at high speed by the take-up spindle 142.

During the rewind, the solenoid SD3 (FIG. 2E) draws the plunger plate 79 against the reversing switches S-5A and S-5B. It also draws the spindle drive arm 88 around the axle 89. The remote end of the spindle drive arm is coupled to the plate 111 through spring 117, so that the plate 111 is withdrawn to release the pinch roller 124 and to disengage the head RPH2 from the cassette message tape. The spindle drive wheel 91 (FIG. 2E) now engages the feed spindle 146 of the cassette drive, and the motor M is driven in reverse to rewind the message tape by reverse drive of the feed spindle 146. During the rewind operation, the eccentric disc 144 causes the switch arm 150 separately to make a break electric contact, and this action continues until the cassette tape reaches the end of its rewind operation and stops.

The over-travel springs 57, 85, 117 and 130 facilitate the assemblage of the apparatus in that they obviate any need for critical tolerances or critical adjustments. During fast forward or rewind, the plate 109 may be moved forward against the tension of spring 110 to bring the erase head into coupled relationship with the message tape, to erase the tape, if so desired.

During the T2 record and playback operating interval, the cassette tape is driven in the forward direction by the capstan 99. The solenoid SD2 is energized, and it causes the pinch roller housing 120 to move the sleeve 124 (FIG. 2C) against the cassette tape and pinch the tape against the capstan. At the same time, the take-up spindle 139 of the cassette is driven at a slightly higher speed by the spindle drive wheel 91 (FIG. 2E), which during forward operation engages the take-up spindle wheel 137. This causes slippage of the clutch through the felt washer 138.

For fast forward operation, the cassette is pulled back from the heads EH2 and RPH2 (FIG. 2C), this being possible because of the over-travel spring 130. This releases the cassette tape from the capstan 99 (FIG. 2E), and permits the take-up spindle to move the tape in the forward direction at increased speed.

For reverse operation of the cassette tape, the solenoid SD3 (FIG. 2E) moves the drive wheel 91 from the take-up spindle wheel 137 (FIG. 2C) to the feed spindle 146. At this time, the solenoid SD2 is de-energized so that the pinch roller housing 120 is retracted and the cassette tape may be freely re-wound on its supply reel.

The erase head plate 109 (FIG. 2C) may be pulled back against the tension of spring 130 (FIG. 2C) during the rewind operation to remove the message tape from the influence of erase head EH2.

Suitable electric circuitry for use in the apparatus of the invention is shown in FIG. 5. As mentioned above, the circuitry is formed on a printed circuit board which may be mounted under the main deck 1 of FIG. 2A. Two of the leads of the telephone cable P-2 connect through a resistor R43 to a neon lamp in a lamp/photoresistor module PC1. The resistor R43 may have a resistance of 150 kilo-ohms. The module PC1 may be a lamp/photoresistor module of the Vactec Type VTL-rB 48. The second lead of the cable P-2 is also connected to a normally open relay contact K2A. The third and fourth leads of the telephone cable P-2 are connected across a pair of normally open relay contacts K2C.

A line transformer T2 is included in the circuit, and one of its windings is connected to the normally open relay contacts K2A and K2B. The other winding of the transformer T2 is shunted by a resistor R8 which may have a resistance of 1 kilo-ohm. One side of the latter winding is grounded, and the other side is connected to a pair of normally closed relay contacts K1D.

The resistor R14 is also connected to a resistor R15 which, in turn, is connected through a resistor R16 to a diode D15. The resistor R15 may have a resistance of 1 kilo-ohm, as may the resistor R16. The junction of the resistors R15 and R16 is connected to a diode D16. Diodes D15 and D16 may be of the type designated IN914. The cathode of the diode D15 is connected to a grounded resistor R18, which is shunted by a capacitor C10. The resistor R18 may have a resistance of 47 kilo-ohms, and the capacitor C10 a capacity of 470 microfarads.

The diode D15, the resistor R18 and the capacitor C10 are connected to the normally open contacts of a single-pole double-throw switch S-7, the switch being connected to the base of an NPN transistor Q4. The transistor Q4 may be of the type designated PN3643. The emitter of the transistor Q4 is connected to a grounded resistor R19 and to a resistor R20. The resistor R19 may have a resistance of 2.2 kilo-ohms, and the resistor R20 may have a resistance of 4.7 kilo-ohms. The resistor R20 is connected to the anode of a diode D13, the cathode of which is connected to the base of an NPN transistor Q5. The diode D13 may be of the type designated IN914, and the transistor Q5 may be of the type designated PN3643. The collector of the transistor Q5 is connected to the energizing coil of a relay K2, and to the anode of a diode D12. The cathode of the diode D12 is connected to the other side of the energizing coil K2. The diode D12 may be of the type designated IN914.

The junction of the resistors R15 and R16 is also connected through a resistor R17 and through a diode D14 to the base of the transistor Q5. The resistor R17 may have a resistance of 4.7 kilo-ohms, and the diode D14 may be of the type designated IN914. The emitter of the transistor Q5 is grounded. The base of the transistor is connected to a grounded resistor R21, which may have a resistance of 4.7 kilo-ohms.

The photoresistor in the module PC1 is connected to a grounded resistor R1 and to the anode of a diode D18. The resistor R1 may have a resistance of 3.3 kilo-ohms, and the diode D18 may be of the type designated IN914. The cathode of the diode D18 is connected through a resistor R2 to the base of an NPN transistor Q1. The resistor R2 may have a resistance of 22 kilo-ohms, and the transistor Q1 may be of the type designated PN3643. The base of the transistor Q1 is connected to a grounded resistor R3 which is shunted by a capacitor C4. The capacitor C4 may have a capacity of 470 microfarads, and the resistor R3 may have a resistance of 47 kilo-ohms.

The collector of the transistor Q1 is connected to the other side of the photoresistor in the module PC1 through a resistor R6. which may have a resistance of 470 ohms. The emitter of the transistor Q1 is connected to the base of an NPN transistor Q2, the transistor Q2 being of the type designated 2N3724. The emitter of the transistor Q2 is grounded, and the base of the transistor is connected to a grounded resistor R4 and to a resistor R5. Each of the resistor R4 and R5 may have a resistance of 1 kilo-ohm. The resistor R5 is connected to a momentary contact switch S-2 which is operated by the pushbutton 206 of FIG. 1. The collector of the transistor Q2 is connected to a normally open relay contact K1B, whose armature is grounded. The collector of transistor Q2 is also connected to the anode of a diode D17, which may be of the type designated IN914. The cathode of the diode D17 is connected to the relay coil K2.

The power cord P-1 is connected through a switch S-1 to the primary winding of a power transformer T1. The secondary winding of the power transformer is connected to a pair of diodes D1 and D2, which may be of the type designated IN4002. The cathodes of the diodes D1, D2 are connected together, and through a resistor R7 to the erase head EH2. The resistor R7 may have a resistance of 560 ohms. The center tap of the secondary winding of the power transformer T1 is grounded, as is the center lead of the power cord P-1. The diode D1 is connected to a grounded capacitor C1, and resistor R7 is connected to a grounded capacitor C2. The capacitor C1 may have a capacity of 150 microfarads, and the capacitor C2 may have a capacity of 100 microfarads. The cathode of the diode D1 is also connected to the normally open contacts of the single-pole double-throw switch S-3, and to the solenoid SD3. The normally open contact of the switch S-3 is also connected to the resistor R6. The armature of the switch S-3 is connected to a relay K1, and its normally closed contact is grounded. The other side of relay K1 is grounded.

The normally open relay contacts K1B are also connected to the diode D7, to the cathode of a diode D3 and to one side of the solenoid SD-1. The other side of the solenoid SD-1 is connected through the normally closed contacts of a switch S-4 to the solenoid SD-2 and to one side of the motor M1. The other side of the solenoid SD-2 is connected through a diode D11 to the relay K2. The diode D11 may of the type designated IN914. The solenoid SD-2 is also connected to a pair of normally closed relay contacts K1A which, in turn, are connected to a pair of normally open relay contacts K2D. The armature of the contacts K2D is grounded. The normally closed relay contacts K2D are connected to the base of the transistor Q4.

The resistor R6 is also connected to the cathode of a diode D10. The diode D10 may be of the type designated IN914. The motor M1 is connected to the double-throw reversing switches S-5A and S-5B, which are intercoupled by a capacitor C3. The capacitor C3 may have a capacity of 47 microfarads. The armatures of switches S-5A and S-5B are connected to the cathode of the diode D1 and to a diode D4. The cathode of the diode D4 is connected to the anode of the diode D10 and to the cathode of a diode D7. The anodes of the diodes D3 and D4 are connected to the anode of a diode D5.

The cathode of the diode D5 is connected to the anode of a diode D6 and to the anode of the diode D11. The diodes D4, D5 and D6 may be of the type designated IN4002, and the diode D7 may may be of the type designated IN914. The anode of the diode D7 is connected to the anode of a diode D8. The diodes D8 and D10 may be of the type designated IN914. The solenoid SD-3 is connected to the cathode of the diode D1 and to the cathodes of the diodes D4 and D7. The erase head EH1 is connected to the erase head EH2 and to the anodes of the diodes D7 and D8. The other side of the erase head EH1 is connected to a pair of normally closed relay contacts K1C.

The six position rotary slide switch S-6, as mentioned above, has six positions, the first position is the "Rewind" position, the second position is the "Automatic Answer", the third position is the "Playback:, the fourth position is the "Announce Only", the fifth Position is the "Record-1" (during which announcements may be recorded by the microphone CD1 on the announcement tape), and the sixth position is the "Record-2" (during which recordings may be made on the cassette tape by the microphone CD1).

The rotary slide switch S-6 has a section A with a grounded movable armature A, and with a contact 1 connected to the anode of the diode D10, a contact 2 connected to the normally closed contacts K1C, a contact 3 connected to the cathode of diode D5 and anode of diode D6, a contact 4 connected back to the base of the transistor Q4, a contact 5 connected to the cathode of a diode D9 and to the cathode of the diode D16, and a contact 6 connected to the cathodes of diodes D6 and D8.

The anode of the diode D9 is connected to the erase head EH1. The diode D9 may be of the type designated IN914. A diode D19 is interconnected between the contacts 4 and 5 of section A of Switch S-6. This diode may be of the type designated IN914. Contact 1 of the A section of switch S-6 is also connected to a resistor R22 which, in turn, is connected to a light emitting diode which forms the call light 204 of FIG. 1. The resistor R22 may have a resistance of 1 kilo-ohm and the light emitting diode 204 may be of the type designated FLV-117. The light emitting diode 204 is connected to the anode of a silicon controlled rectifier Q9. The silicon controlled rectifier may be of the type designated MCR-102. The cathode of the silicon controlled rectifier is grounded, and its gate electrode is connected through a resistor R23 to the emitter of the transistor Q4. The resistor R23 may have a resistance of 3.3 kilo-ohms.

The rotary slide switch S-6 also has a section "B" whose movable armature B is connected to a volume control potentiometer VR1 which, in turn, is connected to a speaker SP-1. The switch S-1 is combined with the volume control potentiometer VR1 in the particular embodiment under consideration. The "B" section of the switch S-6 has a contact 1 which is open, contacts 2, 3 and 4 connected together, and contacts 5 and 6 which are open. The contacts 2, 3 and 4 are also connected to the normally open relay contacts K1C and to a resistor R41. The resistor R41 may have a resistance of 22 ohms.

The resistor R41 is connected to the junction of a resistor R36 and a resistor R38. The resistor R36 may have a resistance of 4.7 ohms, and the resistor R38 may have a resistance of 22 kilo-ohms. The resistor R38 is also connected to the movable armature C of the "C" section of the switch S-6, as is a resistor R37. The resistor R37 has a resistance of 4.7 kilo-ohms. The "C" section of the switch S-6 has an open contact 1, and open contacts 3 and 4. The contacts 2 and 6 of the "C" section are connected to the message record/playback head RPH2. The contact 5 of the "C" section is connected to the announcement record/playback head RPH1. The connections to the heads RPH1 and RPH2 are made through coaxial cables, as shown, and the return leads of the two heads, and the casings of the coaxial cables are grounded.

The rotary slide switch S-6 has a "D" section, whose movable armature D is connected to a capacitor C11, of a capacity of 10 microfarads. The contacts 1 of the "D" section of switch S-6 is grounded. The contacts 3 and 4 are connected to the record/playback head RPH1. The contact 3 is connected to the record/playback head RPH2, and the contacts 5 and 6 are connected to a capacitor C18. The capacitor C18 has a capacity of 0.47 microfarads.

The capacitor C18 is connected to the junction of a pair of resistors R39 and R40. The resistor R39 has a resistance of 1 kilo-ohm, and the resistor R40 has a resistance of 2.2 kilo-ohms. The resistor R39 is grounded, and the resistor R40 is connected to the condenser microphone CD1. The central terminal of the condenser microphone CD1 is grounded, and the third terminal is connected to the resistor R37 and to the base of an NPN transistor Q8. The transistor Q8 may be of the type designated 2N3724. The collector of the transistor Q8 is connected to the base through a resistor R35, whose resistance may be 470 ohms. The emitter of the transistor Q8 is connected to a resistor R32 and to pin 14 of an integrated circuit IC-1.

The integrated circuits IC-1 may be an operational amplifier of the type designated LM-380N. Pins 3, 4, 5, 10, 11 and 12 of the integrated circuit IC-1 are grounded. Pin 1 is connected to a grounded capacitor C15. The capacitor C15 may have a capacity of 10 microfarads. The output pin 8 of the integrated circuit is connected to a capacitor C17 which, in turn, is connected to the resistor R38. The capacitor C17 may have a capacity of 220 microfarads. The base of the transistor Q8 is connected to a grounded capacitor C16. The capacitor C16 may have a capacity of 100 microfarads.

The capacitor C11 is connected through a resistor R27 to a pair of resistors R28, R29 and to the base of a transistor Q6. The resistor R27 may have a resistance of 560 ohms, the resistor R28 may have a resistance of 15 kilo-ohms, and the resistor R29 may have a resistance of 100 kilo-ohms. The transistor Q6 is an NPN transistor of the type designated SE4010. The emitter of the transistor Q6 is grounded, and its collector is connected to the base of an NPN tansistor Q7 and to a resistor R26. The transistor Q7 may also be of the type designated SE4010. The resistor R26 may have a resistance of 47 kilo-ohms. The collector of the transistor Q7 is also connected to a capacitor C13 and to a resistor R31. The resistors R26 and R31 are both connected to the resistor R32, and to a grounded capacitor C14. The resistor R31 may have a resistance of 22 kilo-ohms, and the capacitor C14 may have a capacity of 100 microfarads. The capacitor C13 is connected to the input pin 2 of the operational amplifier IC-1. The input pin 6 of the amplifier is connected to a grounded resistor R34, which may have a resistance of 5.6 kilo-ohms.

The resistor R29 is connected to the emitter of the transistor Q7 and to a grounded resistor R30. The resistor R28 is connected through a capacitor C12 to the emitter of the transistor Q7. The resistor R30 may have a resistance of 6.8 kilo-ohms, and the capacitor C12 may have a capacity of 0.022 microfarads. The resistor R9 is connected to the armature of pairs of normally closed and normally open relay contacts K1D. The normally closed relay contacts K1D are connected to a resistor R25 and to a resistor R35, and the normally open relay contacts K1D are connected to a resistor R24 and to the resistor R36. The resistors R24 and R25 are grounded. The resistor R25 has a resistance of 1.5 kilo-ohms, as has the resistor R24. The resistor R35 has a resistance of 470 ohms.

The circuit of FIG. 5 may be connected to an appropriate voice operated (Vox) circuit, such as described in copending application Ser. No. 403,035 filed Oct. 3, 1973 in the name of the present inventor, through connections designated A, B, C and D in FIG. 5. The connection A is connected to one side of the secondary winding of the line transformer T2, the connection B is connected to the switch S-7, the connection C is connected to the collector of the transistor Q8, and the connection D is grounded.

In describing the operation of the system of FIG. 5, it will first be assumed that the rotary slide switch S-6 is set to its "ANS" position, in which the various movable armatures A, B, C and D engage respective contacts 2. Now, should a ring signal be received over the telephone line, the neon lamp in the PC-1 module illuminates the photoresistor causing the resistance of the photoresistor to drop. After a time delay determined by the integrating circuit R2/C4, the capacitor C4 charges sufficiently so that transistors Q1 and Q2 become conductive. This causes the solenoid SD-1 to be energized, and motor M1 is also energized through diode D3. The capstan pully 31 and 98 of FIG. 3 now turn to drive the capstans 30 and 99.

When the solenoid SD-1 and motor M1 are energized, the T1 announcement interval is initiated, and the announcement tape AT (FIG. 3) is moved from its reference position, since solenoid SD-1 causes the announcement tape pinch roller assembly to press the announcement tape against the capstan 30, movement of the announcement tape causes switch S-3 to close its normally open contacts and open its normally closed contacts. When the normally open contacts of switch S-3 close, the energizing coil of relay K1 is connected to the $V_{cc}$ lead, and relay K1 becomes energized. This causes the holding contacts K1B to close, so that the solenoid SD-1 remains energized, even through the termination of the ring signal causes the transistors Q1 and Q2 to return to their non-conductive states.

The closure of the normally open contacts of switch S-3 also connects the resistor R15 to the $V_{cc}$ lead, and this causes the capacitor C10 to assume a charge. The capacitor C10 is included in a fixed-time timer circuit for timing the message interval T2 of the system. This circuit also includes the resistor R18, the transistor Q4, and the various circuit elements associated with the transistor. When the switch S7 is in its illustrated position, the fixed-time timer circuit of the transistor Q4 is effective. On the other hand, when the switch S-7 is switched to its other position, the transistor Q4 is connected to a voice operated (Vox) circuit connected, for example, to the terminals A, B, C, D and E, so that the message recording interval T2 remains effective so long as the calling party continues to talk. However, when the switch S-7 is in the illustrated position, the fixed-time timer circuit controls, and the calling party must record his message within a fixed-time T2 interval.

The closing of the normally open contacts of switch S-3 also causes the transistor Q5 to become conductive through resistors R15 and R17, and through diode D14. This energizes the relay K2. Therefore, during the original announcement interval (T1) both the relays K1 and K2 are energized.

Figure 3:
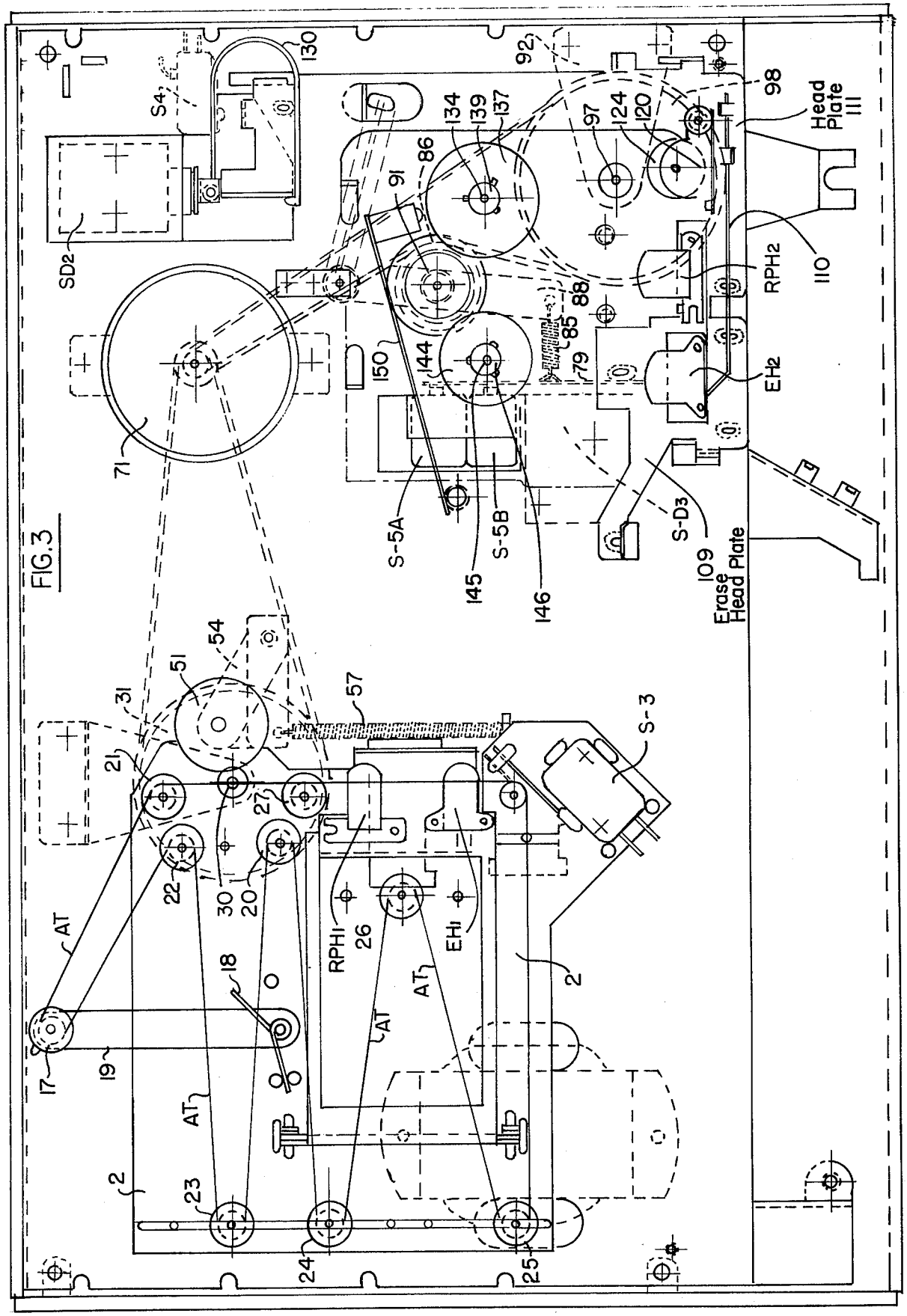
FIG. 3 is a top plan view of the apparatus of FIGS. 2A–2E.
Figure 4:
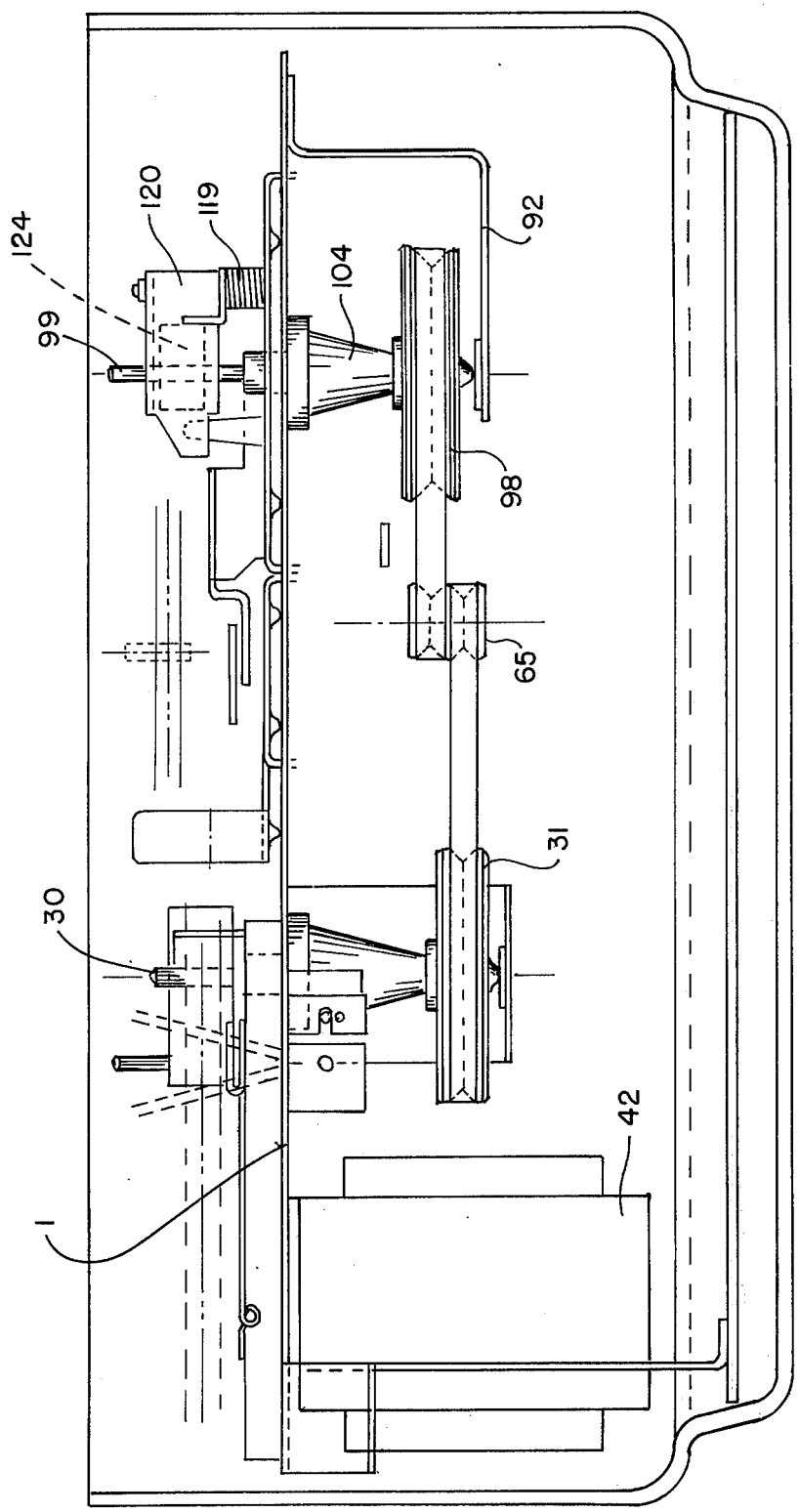
FIG. 4 is a side section of the apparatus of FIG. 3, but showing only a few of the various mechanical components of the apparatus.

Since both the solenoid SD-1 and the motor M1 are energized during the announcement interval T1, the announcement tape AT of FIG. 3 is driven past the magnetic head RPH-1 during that interval, and the announcement on the announcement tape is sensed by the head. The resulting audio signals are amplified by the circuits of transistors Q6 and Q7. The feedback through the capacitor C12 and resistor R28 provides audio shaping. The amplified output from the transistor Q7 is further amplified in the integrated circuit IC-1, and the output from the integrated circuit is fed through capacitor C17 and resistor R36, and through the normally open relay contacts K1D to the transformer T2. The resulting signal from the transformer T2 is passed through the normally open relay contacts K2A and K2B to the telephone line, so that the announcement may be transmitted to the calling party.

The transmission of the announcement to the calling party continues throughout the T1 announcement interval, and until the announcement tape has made a complex circulation, at the end of which the normally open contacts of switch S-3 open, and the normally closed S-3 contacts close. As the normally open contacts of switch S-3 open, the relay K1 is de-energized. This signifies the end of the announcement interval T1, and the beginning of the message recording interval T2. During the latter interval, only the relay K2 is energized.

As the relay K1 is de-energized at the end of the announcement interval T1, its normally open contacts K1B open to de-energize the solenoid SD-1, and also to de-energize the motor M1. Therefore, the announcement tape stops. However, as the relay K1A is de-energized at the end of the interval T1, its normally closed contacts K1A close to energize the solenoid SD-2 through those contacts, and through the normally open relay contacts K2D. As the solenoid SD-2 is energized, the motor M1 is again energized through the diode D5. Interlock switch S4 now opens, to assure that the solenoid SD-1 cannot be energized during the T2 interval. The energizing of the solenoid SD-2, and the energizing of the motor M1, cause the cassette message tape to move forward past the magnetic head RPH2.

After the calling party begins to speak, the voice signals pass through the relay contacts K2A, K2B to the transformer T2, and through the transformer and through the normally closed contacts K1D to the input of the integrated circuit operational amplifier IC-1. The resulting amplified signals from the integrated circuit are then passed to the magnetic head RPH2, so that the message may be recorded on the message tape.

At the beginning of the message recording interval T2, the opening of the normally open contacts of switch S-3 removes the charging current from the capacitor C10 in the fixed-time timer circuit, and capacitor C10 starts to discharge through resistor R18. After a predetermined time interval, the transistor Q4 is rendered non-conductive to de-energize the relay K2. When the relay K2 drops out, its normally closed contacts K2D place a ground on the base of the transistor Q4, causing the treatment to be immediately driven to its non-conductive state, to assure an abrupt de-energizing of the relay K2.

The first call received when the system is in the "ANS" position of the switch S-6, closes a charging circuit to the capacitor C10 in the fixed-time timer circuit to charge up the capacitor, as described above. This, in turn, causes the transistor Q4 to become conductive. When the transistor Q4 first becomes conductive, it fires the silicon controlled rectifier Q9, so that the light emitting diode call light 204 glows to indicate that a call has been received. The silicon controlled rectifier Q9 latches, so that the light emitting diode 204 remains illuminated until the switch S-6 is moved to its "RWND" position. Then, a ground is placed on the anode of the silicon controlled rectifier Q9 through contact 1 of switch section S-6A, and through the resistor R22 and the light emitting diode 204, so that the silicon controlled rectifier is again established in its non-conductive state. Therefore, the light emitting diode call light 204 remains illuminated until the message tape is rewound.

To rewind the message tape, the armatures A, B, C and D of the rotary slide switch S-6 are set to the respective contacts 1, at the "RWND" position. This causes armature D to place a ground on capacitor 11 at the input of the circuit of transistor Q6 to cut off the audio system; and armature A to place a ground on the lower side of the solenoid SD-3 to energize the solenoid. When the solenoid SD-3 is energized, it operates the switches S5A and S5B so that the motor M1 is operated in the reverse mode. The switches S5A and S5B also place a ground through the normally closed contacts K1B on both sides of the solenoids SD-1 and SD-2 to assure that neither of these two solenoids can be energized during the rewind mode. The motor M1, and the rewind solenoid SD-3 now operate in the manner described above to return the cassette message tape to its origin position.

To set the system to the playback mode, the armatures A, B, C and D of the rotary slide switch S-6 are moved to the respective contacts 3 at the "PB" position. The solenoid SD-2 is now operated, and the motor M1 is energized in its forward direction. The message tape is now moved past the head RPH2, and the resulting signals from the head are passed through the switch section B to the speaker SP1 for monitoring purposes, and the switch section A causes the signals from the head RPH2 to be passed to the input of the transistor Q6, for amplification by the amplifier circuits of transistors Q6 and Q7, and by the integrated circuit IC-1, for transmission through the switch section B to the speaker SP1. It may be noted that the switch section B connects the speaker SP1 in circuit during the "ANS" position and during the "ANN" position of switch S-6 for silent monitoring purposes.

When the rotary slide switch S-6 is set to the announcement position "ANN", the various armatures A, B, C, D engage the respective contacts 4. For this position, the system respond to an incoming telephone call to transmit the announcement to the calling party during the T1 announcement interval. However, the section A places a ground on the base of transistor Q4, so that the timing capacitor C10 cannot acquire a charge, and the system cannot enter its T2 message recording mode. Therefore, no messages are accepted when the system is in this operating mode, but merely an announcement is made to each calling party.

When the rotary slide switch S-6 is set to "RC1" record position, the armatures A, B, C, D engage the respective contacts 5, and the system is set to a condition such that new announcements may be recorded on the announcement tape (AT) by means of the microphone CD1. Finally, when the rotary slide switch S-6 is set to the "RC2" record position, the armatures A, B, C, D engage the respective contacts 6, so that recordings may be made from the microphone CD1 on the cassette message tape, for dictation purposes, or the like.

The erase head EH-2 is energized during the rewind operation as the armature A places a ground on contact 1 of the section A of switch S-6. This causes current to flow through the erase head EH-2, from the voltage lead $V_c$. However, as described, the erase head EH-2 is normally retracted from the message tape during rewind.

During the answer mode of operation, and when the armatures A, B, C, D of the switch S-6 engage the respective contacts 2, current does not flow through either of the erase heads during the announcement interval T1, since the relay K1 is energized at that time and its normally closed relay contacts K1C are open. However, during the following message interval T2, the relay K1C is de-energized, and its normally closed contacts K1C close so that both erase heads are energized. However, only the head EH-2 is effective because the tape T-1 is not moving during the T2 interval. The head EH-2 now functions to erase the old messages as the new ones are recorded on the message tape.

The erase head EH-2 is effective during the Record 2 (RC2) operation as the armature A of switch S-6 places a ground on contact 6 of section S-6A so that erasing flows through head EH-2 and diode D8. This causes old dictation to be erased as new dictation is recorded on the message tape.

The erase head EH-1 is effective during the Record 1 (RC1) operation, as the armature A of switch S-6 places a ground on contact 6 of switch section A, so that erasing current flows through the head EH-1 and through diode 9.

The invention provides, therefore, an improved telephone answering apparatus which is inherently simple in its construction as compared with the prior art apparatus of the same general type, and yet which is capable of performing all the operations of the prior art systems.

It will be appreciated that although a particular embodiment has been shown and described, modifications may be made. It is intended in the claims to cover the modifications which come within the spirit and scope of the invention.

What is claimed is:

1. A telephone answering apparatus including in combination: means mounted in said apparatus for receiving a removable magnetic message tape unit; capstan drive means mounted in said apparatus on one side of the path of the magnetic message tape from said unit for driving the message tape; a first plate slidably mounted in the apparatus; a pinch roller assembly mounted on said plate on the opposite side of the path of said message tape from said capstan drive means; electromagnetic transducer means mounted on said plate; first solenoid means; resilient means mechanically coupling the first solenoid means to said plate for selectively causing the pinch roller assembly to move the message tape into driving engagement with the capstan drive means and for simultaneously moving the electromagnetic transducer means into operating relationship with the message tape when the first solenoid means is energized; and further resilient means coupled to said plate for pulling the pinch roller assembly back from the capstan drive means when the first solenoid is de-energized.

2. The telephone answering apparatus defined in claim 1, and which includes a second plate slidably mounted in the apparatus and mechanically coupled to the first plate; and electromagnetic erase transducer means mounted on the second plate to be brought into operating coupled relationship with the message tape when the first solenoid means is energized.

3. The telephone answering apparatus defined in claim 2, and which includes a drive motor mounted in the apparatus mechanically coupled to said capstan drive means; first and second spindle means mounted in the apparatus for receiving a cassette type of message tape unit; a second solenoid means; and coupling means for mechanically selectively coupling the drive motor to the first and second spindle means and including a mechanism mechanically coupled to the second solenoid means and to at least one of the plates to retract the first and second plates, and to change the coupling of the drive motor from one of the spindle means to the other, when the second solenoid means is energized.

4. The telephone answering apparatus defined in claim 3, and which includes resilient means coupling the second plate to the first plate to permit the second plate to be pulled forward to cause the erase transducer means to be magnetically coupled to the message tape when the second solenoid means is energized.

5. The telephone answering apparatus defined in claim 2, and which includes electrical switching means actuated by the second solenoid means to reverse the drive of the electric motor when the second solenoid means is energized.

6. The telephone answering apparatus defined in claim 1, and which includes first and second spindle means mounted in the apparatus for receiving a cassette-type of removable magnetic message tape unit, and which includes a drive motor, and coupling means for selectively mechanically coupling the drive motor to the first and second spindle means for forward and reverse drive of the message tape in the cassette unit, and a second solenoid means coupled to said coupling means to control the reverse drive of the message tape.

7. The telephone answering apparatus defined in claim 6, and which includes friction clutch means included in one of the spindle means to provide a slippage clutch action during forward drive of the message tape in the cassette unit when the first solenoid means is energized.

8. The telephone answering apparatus defined in claim 6, and which includes interlock switching means to de-energize the first solenoid means whenever the second solenoid means is energized.

* * * * *

UNITED STATES PATENT OFFICE
CERTIFICATE OF CORRECTION

Patent No. 3,959,591  Dated May 25, 1976

Inventor(s) James R. Darwood

It is certified that error appears in the above-identified patent and that said Letters Patent are hereby corrected as shown below:

Column 14, line 49, "2" should read -- 3 --.

Signed and Sealed this

Seventeenth Day of May 1977

[SEAL]

Attest:

RUTH C. MASON
*Attesting Officer*

C. MARSHALL DANN
*Commissioner of Patents and Trademarks*